United States Patent [19]

Paratte et al.

[11] Patent Number: 5,263,577
[45] Date of Patent: Nov. 23, 1993

[54] HOLDER FOR A REPLACEMENT BATTERY FOR A WATCH

[75] Inventors: Daniel Paratte, Neuchatel; Charles-Henri Delacrétaz, Granges, both of Switzerland

[73] Assignee: Eta SA Fabriques d'Ebauches, Granges, Switzerland

[21] Appl. No.: 980,194

[22] Filed: Nov. 23, 1992

[51] Int. Cl.$^5$ .................. B65D 6/06; B65D 85/40
[52] U.S. Cl. ................... 206/38.1; 206/333; 220/347
[58] Field of Search ........... 206/0.81, 38, 38.1, 206/328, 333; 220/345–347

[56] References Cited

U.S. PATENT DOCUMENTS

| | | | |
|---|---|---|---|
| 3,995,767 | 12/1976 | Brindley et al. | 206/333 |
| 4,015,708 | 4/1977 | Kelm | 206/333 |
| 4,209,091 | 6/1980 | Lieberman | 206/333 |
| 4,844,284 | 7/1989 | Drozd et al. | 220/347 |
| 4,860,890 | 8/1989 | Cerny et al. | 206/333 |
| 4,926,401 | 5/1990 | Vuilleumier et al. | 368/88 |
| 4,953,700 | 9/1990 | De Dino | 206/333 |
| 5,033,616 | 7/1991 | Wyser | 206/333 |
| 5,077,572 | 12/1991 | Morisawa | 206/333 |
| 5,117,977 | 6/1992 | Voroba | 206/333 |

FOREIGN PATENT DOCUMENTS 1193947  11/1959  France .

*Primary Examiner*—Jimmy G. Foster
*Attorney, Agent, or Firm*—Griffin Bubler Whisenhunt & Kurtossy

[57] ABSTRACT

This holder (2) for a replacement battery (12) for a watch, in addition to a housing for holding such battery, includes means (15) for gaining access to the watch battery which is to be exchanged. Accessory thereto, the holder may serve as a key holder and present the advantage of of always being carried by the person wearing the watch. The holder is in two parts: a sheath (17) in which a drawer (18) is fitted, such drawer bearing the replacement battery (12) and an incorporated tool (15) which enables extraction of the exhausted battery from the watch.

6 Claims, 3 Drawing Sheets

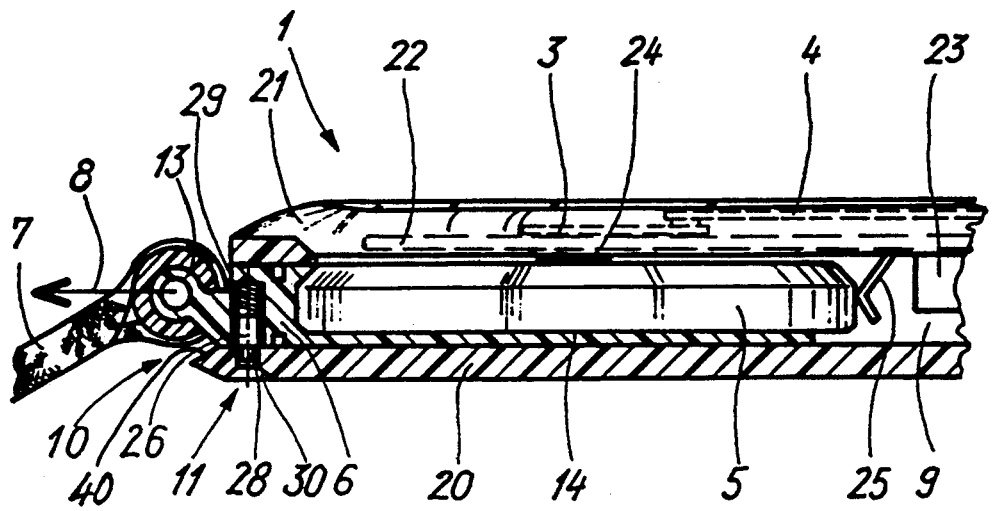
Prior art  Fig. 4
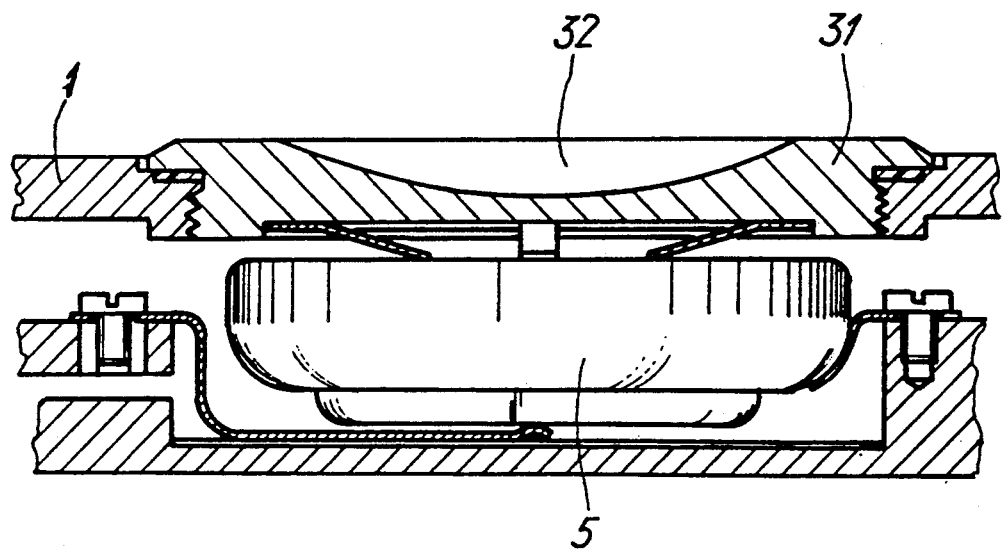
Prior art  Fig. 5

HOLDER FOR A REPLACEMENT BATTERY FOR A WATCH

The present invention concerns a holder for a replacement battery for a watch, such watch including a housing in which a support for a battery for energizing the watch may be engaged and locked.

BACKGROUND OF THE INVENTION

Watches including a housing in which may be engaged and locked a support in which may be placed a battery for energizing the watch, are known and two examples thereof are to be discussed in this description. Here in fact it concerns enabling the watch wearer himself to change the battery of his watch without calling on a person skilled in the art. According to the design of the watch, the battery may be introduced either by the back cover and held in place by means of a screwed-in stopper, or at the side thereof and supported in such case by a drawer. Locking and unlocking of the support, stopper or drawer, may be effected by means of a tool delivered upon purchase of the watch, such tool being of such nature as may be readily misplaced or forgotten by the wearer when it is necessary to change the battery. In order to avoid such tool, solutions have already been proposed which, as may be seen hereinafter, call on the use of either a coin or of a bracelet buckle, such solutions not necessarily being the most felicitous for reasons which will appear hereinafter.

SUMMARY OF THE INVENTION

Since replacement batteries must meet certain packaging requirements for sale to the public and such packaging calls for a holder in which the battery is enveloped, the assignee of the present invention had the idea of employing such container in order to incorporate therein means permitting at least the unlocking of the support bearing the battery which is to be changed, such support forming part of the watch.

The invention will now be explained with the help of the description which follows given by way of example and in referring to the drawings which illustrate it.

BRIEF DESCRIPTION OF THE DRAWINGS

FIG. 4 is a partial showing of a watch provided with a battery support which may be unlocked by the holder of FIG. 1, and FIG. 5 is a partial showing of a watch provided with a battery support which may be locked and unlocked by the holder of FIG. 2.

DESCRIPTION OF THE PREFERRED EMBODIMENTS

Figure 1:
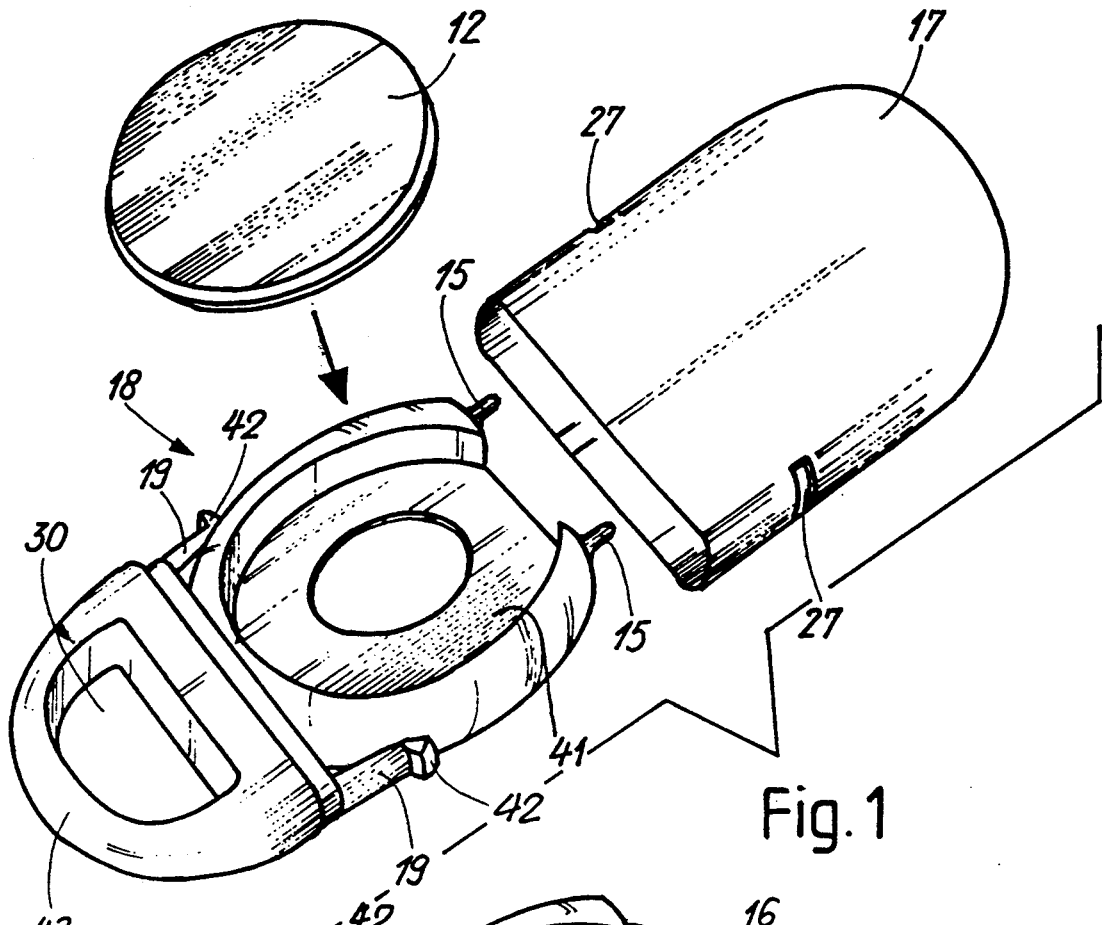
FIG. 1 is a perspective view of the holder according to the invention and according to a first embodiment thereof.

FIG. 4 is a cross-section of the back cover portion of a watch comprising on one hand a case 1 attached on either side to a bracelet of which only strand 7 is shown. In such watch case are found display means, here shown by hours hand 3 and minutes hand 4. The wrist watch includes an energization battery 5 housed in a drawer 6, such drawer being attached to bracelet strand 7 by means of a hinge joint 13. Battery 5 and the drawer 6 which bears it may be taken out in the sense of arrow 8 from housing 9 via an opening 10 formed in the case. Such case is bounded by a back cover 20 and an upper portion or caseband 21. Drawer 6 includes a bottom support 14 which receives battery 5. The battery energizes an electronic circuit 23 through its connections 24 and 25. A mechanism 22 drives hands 3 and 4.

The watch comprises means 11 for locking drawer 6 in case 1. Such means here consist of a pushpiece 26 sliding in a tube anchored in drawer 6. Pushpiece 26 includes a head 28 which emerges from the tube under the urging of a spring 29. When the drawer is introduced into its housing 9, head 28 of the pushpiece 26 penetrates into a hole 30 formed in the back cover 20 and thus blocks the drawer inside the case. In order to take out the drawer, it is necessary to push on head 28 while simultaneously pulling on strand 7. Inversely, at the end of the introduction of the drawer into the case, the pushpiece 26 is retracted into the tube by the combined action of head 28 and of a ramp 40 equipping back cover 20 up to the point where head 28 is located above hole 30 into which it penetrates.

The locking of drawer 6 includes at least one pushpiece 26. Preferably there will however be available two push-pieces in order to assure closing which is stable and without play. In order to exert pressure on the pushpiece, one may employ any pointed object whatsoever. A system described in Swiss patent application 01 910/90-7 belonging to the same assignee consists in using the buckle attached to one of the ends of the bracelet, such buckle bearing two protuberances formed as extensions of the branches of the buckle. If the separation of such protuberances corresponds to the spread existing between the heads 28 of the locking system, one may use the buckle as unlocking key by forcing such protuberances into the holes 30 in order to retract heads 28 into the drawer and thus free such drawer from the case.

This system, however astute it may be, may give rise to a difficulty which is that of hooking on to the clothing of the watch wearer and thus damaging such clothing. In order to overcome this difficulty, there is proposed the replacement battery holder such as is shown on FIG. 1, wherein there appears at least one nipple 15 adapted to be introduced into hole 30 in order to retract the pushpiece head shown on FIG. 4.

FIG. 1 shows in perspective the holder according to the invention and according to a first embodiment thereof. Such holder includes two parts, a first part forming a sheath 17 in which a second part forming a drawer 18 is adapted to be latch engaged. FIG. 1 shows that drawer 18 includes a circular housing 41 in which the battery 12 may be placed. Drawer 18 also includes two nipples 15 which serve, as has been explained hereinabove, to liberate drawer 6 from the watch case by engaging of such nipples 15 into holes 30 in order to retract heads 28 of pushpieces 26.

FIG. 1 also shows a form of latching of the drawer 18 into sheath 17. For this drawer 18 bears two elastic tongues 19, each of the tongues being terminated at its free end by a hook 42 adapted to penetrate into an opening 27 provided in sheath 17. The design is such that the tongue and its hook assume a form enabling the tongue to yield when traction is exerted on the drawer.

FIG. 1 further shows that drawer 18 of the holder includes an extension 43 which remains outside sheath 17 when the drawer is pushed into the sheath. Such extension 43 evidently enables grasping the drawer in order to disengage it from the sheath. Such extension 43 may also be provided with an opening 30 to further facilitate grasping of drawer 18 as illustrated on FIG. 1.

Figure 3:
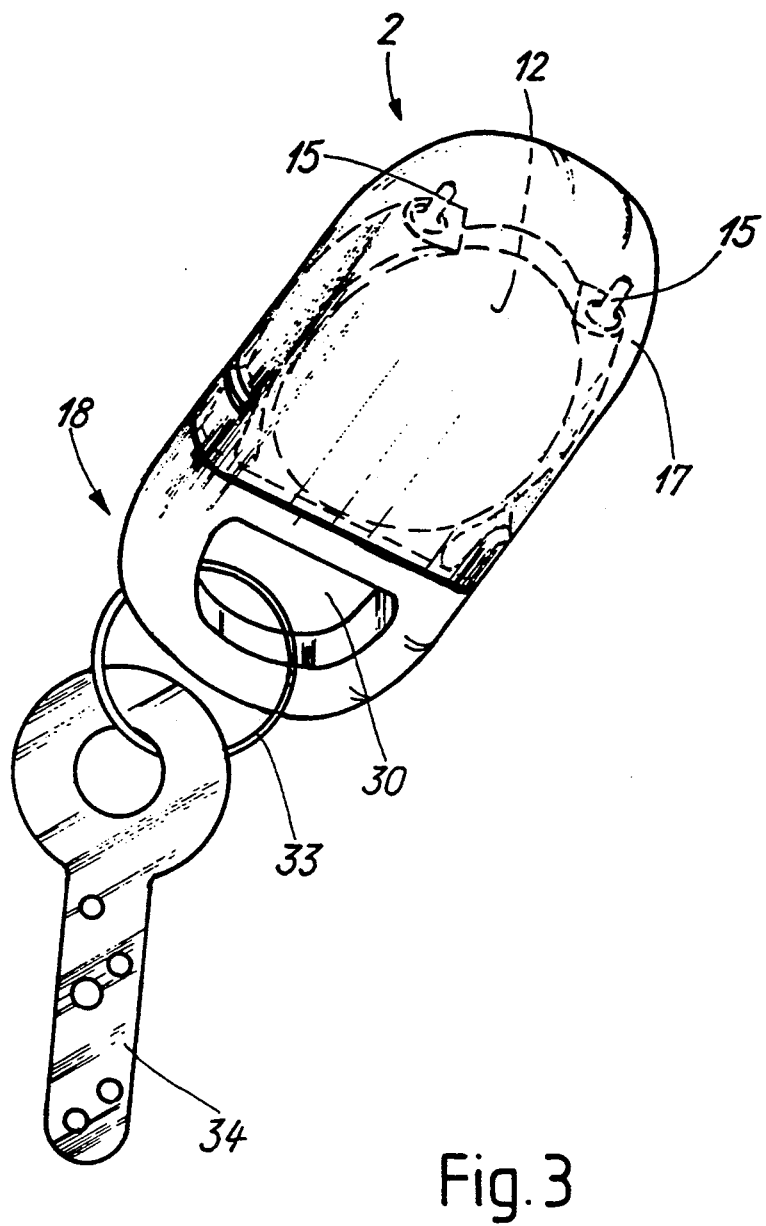
FIG. 3 is a view of the holder according to FIG. 1, but shown closed and illustrating its use as a key ring.

If now one refers to FIG. 3 which shows holder 2 assembled, it will be noted that a further benefit may be obtained from opening 30 provided in the extension of drawer 18 in order to engage therein a split ring 33, such ring receiving at least one key 34. In this application the battery holder 2 is conjointly employed as a key ring.

Figure 2:
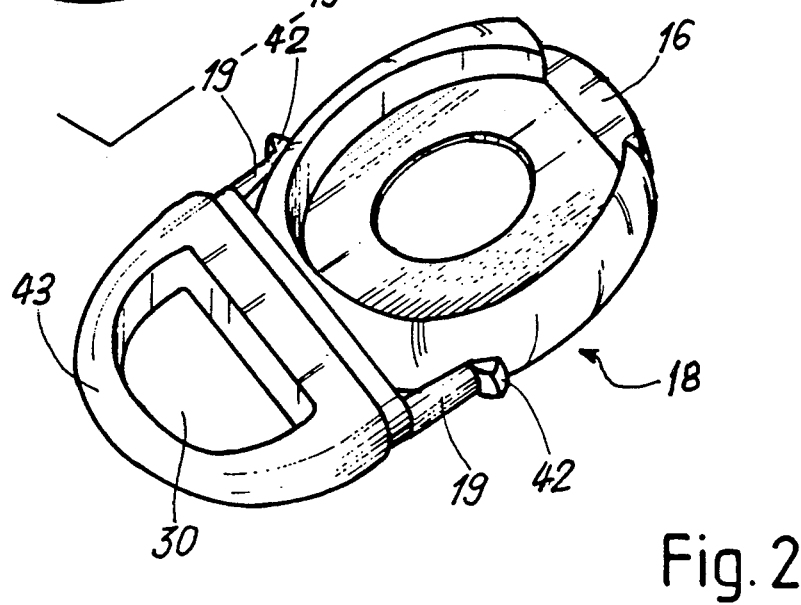
FIG. 2 is a perspective view of one of the parts of the holder according to the invention and according to a second embodiment thereof.

There will now be described a second embodiment of the drawer of the holder. Such second embodiment is adapted for a watch partially shown on FIG. 5. Here the support for battery 5 is a stopper 31 screwed into the back cover of the watch case. Stopper 31 bears a slot 32 which enables the unscrewing thereof in order to permit changing of the battery. Generally, there has been recommended the use of a coin in order to unscrew the stopper. Since the watch user does not necessarily have on his person such a coin having the desired thickness, the idea is to replace the coin by a tool incorporated in the drawer of the holder. According to the invention, the stopper is unscrewed by means of a tongue 16 formed at the end of drawer 18 as is shown on FIG. 2.

Thus, in both embodiments taken as example, the holder is employed not only to carry the replacement battery, but further to serve as a tool for changing the watch battery, such holder being further adapted to be used as a key ring which almost anybody wearing the watch will have with him.

What we claim is:

1. A holder for a replacement battery for a watch, said watch including a housing in which a support for a battery for energizing the watch may be engaged and locked, said holder, in addition to bearing the replacement battery, comprising at least means for unlocking said support bearing said battery to be changed, said support comprising a drawer adapted to be engaged in a lateral opening in the case exhibited by the watch, said drawer being locked in the watch by means of at least one pushpiece forming part of said drawer, the pushpiece including a head penetrating into a hole formed in the case and the unlocking means borne by the holder comprising at least one nipple adapted to be introduced into said hole in order to retract the pushpiece head into the drawer and thus enable the disengagement of said drawer out of the watch.

2. A holder for a replacement battery for a watch, said watch including a housing in which a support for a battery for energizing the watch may be engaged and locked, said holder, in addition to bearing said support bearing said battery to be changed, said holder including a first part forming a sheath in which a second part forming a drawer is adapted to be latch engaged, said second part bearing said replacement battery and said unlocking means.

3. A holder as set forth in claim 2 in which latching of the drawer in the sheath is effected by means of two elastic tongues formed in the drawer, each tongue including a hook at its free end adapted to penetrate into an opening exhibited by the sheath, the form of the tongue and its hook being chosen in a manner such that latching of the drawer onto the sheath yields when traction is exerted on said drawer.

4. A holder as set forth in claim 2 wherein the second part forming a drawer comprises an extension exterior to the first part forming a sheath when the two parts are engaged with one another, said extension enabling grasping the drawer in order to disengage it from the sheath.

5. A holder as set forth in claim 4 wherein said extension is provided with an opening to facilitate grasping thereof.

6. A holder as set forth in claim 5 in which a split ring may be engaged in said opening, said ring being adapted to receive at least one key.

* * * * *

UNITED STATES PATENT AND TRADEMARK OFFICE
CERTIFICATE OF CORRECTION

PATENT NO. : 5,263,577

DATED : November 23, 1993

INVENTOR(S) : Daniel Paratte et al.

It is certified that error appears in the above-identified patent and that said Letters Patent is hereby corrected as shown below:

On the title page:
In the heading, after the line reading

"[22] Filed : November 23, 1992,"
insert two new lines reading,

-- [30] Foreign Application Priority Data
November 28, 1991 [CH] Switzerland 03489/91-0 --.

Signed and Sealed this

Fifth Day of April, 1994

Attest:

*Attesting Officer*

BRUCE LEHMAN

*Commissioner of Patents and Trademarks*